United States Patent
Shoemaker

[15] 3,659,923
[45] May 2, 1972

[54] SIX COMPONENT 100X MICROSCOPE OBJECTIVE

[72] Inventor: Arthur H. Shoemaker, East Aurora, N.Y.

[73] Assignee: American Optical Corporation, Southbridge, Mass.

[22] Filed: Mar. 17, 1971

[21] Appl. No.: 125,080

[52] U.S. Cl. .......................350/215, 350/175 ML, 350/176, 350/177
[51] Int. Cl. .........................................................G02b 21/02
[58] Field of Search....................350/215, 175 ML, 176, 177

[56] References Cited

UNITED STATES PATENTS 3,524,694  8/1970  Klein.................350/215 X
3,537,772  11/1970  Shoemaker.........................350/176

Primary Examiner—John K. Corbin
Attorney—William C. Nealon, Noble S. Williams, Robert J. Bird and Bernard L. Sweeney

[57] ABSTRACT

A six component achromatic oil immersion microscope objective having a magnification of 100X and a numerical aperture of 1.25.

2 Claims, 1 Drawing Figure

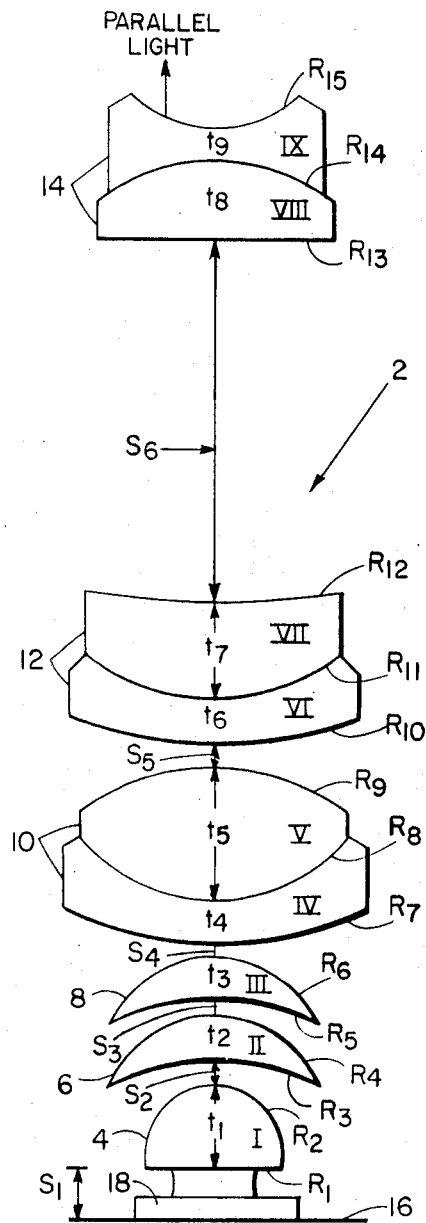

SIX COMPONENT 100X MICROSCOPE OBJECTIVE

BACKGROUND OF THE INVENTION

This invention relates to improvements in a microscope objective, and in particular to an achromatic oil immersion microscope objective with a numerical aperture of substantially 1.25 and a magnification of substantially 100X. It is the object of the present invention to provide such a microscope objective which is well corrected for the usual chromatic image aberrations as well as spherical aberration, coma, and astigmatism, while having a substantially flat image field when used with a telescope objective as described for example in U.S. Pat. No. 3,355,234 issued to Robert M. Muller.

DRAWING

The drawing is an optical diagram of a microscope objective of the present invention.

DESCRIPTION

Referring now to the drawing, a microscope objective is generally shown at 2. It includes the following components: a front single lens 4, a single lens 6, a single lens 8, a doublet 10, a doublet 12, and a doublet 14, all of said components being optically aligned. Objective 2 is shown disposed relative to an object plane 16 supporting a specimen 18 with immersion oil in the space between the specimen 18 and the front lens element.

Lens 4 is a plano-convex lens, also designated I. Lens 6 is a concavo-convex positive meniscus shaped lens, also designated II. Lens 8 is a concavo-convex positive meniscus shaped lens, also designated III. Doublet 10 includes a convex-concave lens element IV and a double convex lens element V, together forming a positive double convex doublet. Doublet 12 includes a convex-concave lens element VI and a convex-concave lens element VII, together forming a convex-concave doublet. Doublet 14 includes a plano-convex lens element VIII and a double concave lens element IX, together forming a plano-concave doublet.

The parameters of the lens elements which make up the objective are as listed in the following table in which ND is the refractive index for the D line of sodium, $\gamma$ is the Abbe number. Radii (R), thicknesses (T), and spacings (S) are expressed in millimeters and a negative sign indicates radii on centers of curvature lying on the object side of their vertices.

Magnification = 100X  N.A. = 1.25

| Lens | Radius R | Thickness T | Space S | Refractive Index ND | Abbe number $\nu$ |
|---|---|---|---|---|---|
| I | $R_1$ = Plano | $T_1$ = 1.5110F | $S_1$ = .1703F | $ND_1$ = 1.51700 | $\nu_1$ = 64.50 |
|   | $R_2$ = −1.1841F |   |   |   |   |
| II | $R_3$ = −2.8995F | $T_2$ = 1.0165F | $S_2$ = .0110F | $ND_2$ = 1.60550 | $\nu_2$ = 43.93 |
|    | $R_4$ = −2.0209F |   |   |   |   |
| III | $R_5$ = −7.2198F | $T_3$ = 1.0879F | $S_3$ = .0110F | $ND_3$ = 1.60550 | $\nu_3$ = 43.93 |
|     | $R_6$ = −4.4868F |   |   |   |   |
| IV | $R_7$ = 7.2198F | $T_4$ = .6593F | $S_4$ = .1648F | $ND_4$ = 1.80491 | $\nu_4$ = 25.43 |
|    | $R_8$ = 4.3852F |   |   |   |   |
| V | $R_9$ = −5.4187F | $T_5$ = 2.8516F |   | $ND_5$ = 1.48651 | $\nu_5$ = 84.47 |
| VI | $R_{10}$ = 7.7912F | $T_6$ = .6593F | $S_5$ = .0275F | $ND_6$ = 1.80491 | $\nu_6$ = 25.43 |
|    | $R_{11}$ = 2.8731F |   |   |   |   |
| VII | $R_{12}$ = 39.7253F | $T_7$ = 2.9374F |   | $ND_7$ = 1.48651 | $\nu_7$ = 84.47 |
| VIII | $R_{13}$ = Plano | $T_8$ = 1.1725F | $S_6$ = 7.3016F | $ND_8$ = 1.75496 | $\nu_8$ = 27.58 |
|      | $R_{14}$ = −2.0945F |   |   |   |   |
| IX | $R_{15}$ = 4.7341F | $T_9$ = .9929F |   | $ND_9$ = 1.61328 | $\nu_9$ = 44.30 |

The foregoing parameters of radius, thickness, and spacing are based on the value of F. The value of F in this case, as an example, is 1.820. At this focal length, the absolute values of the foregoing data is as follows:

F = 1.820  Magnification = 100X  N.A. = 1.25

| Lens | Radius R | Thickness T | Space S | Refractive Index ND | Abbe Number $\nu$ |
|---|---|---|---|---|---|
| I | $R_1$ = Plano | $T_1$ = 2.750 | $S_1$ = .31 | $ND_1$ = 1.51700 | $\nu_1$ = 64.50 |
|   | $R_2$ = −2.155 |   |   |   |   |
| II | $R_3$ = −5.277 | $T_2$ = 1.850 | $S_2$ = .02 | $ND_2$ = 1.60550 | $\nu_2$ = 43.93 |
|    | $R_4$ = −3.678 |   |   |   |   |
| III | $R_5$ = 13.140 | $T_3$ = 1.980 | $S_3$ = .02 | $ND_3$ = 1.60550 | $\nu_3$ = 43.93 |
|     | $R_6$ = −8.166 |   |   |   |   |
| IV | $R_7$ = 13.140 | $T_4$ = 1.200 | $S_4$ = .300 | $ND_4$ = 1.80491 | $\nu_4$ = 25.43 |
|    | $R_8$ = 7.981 |   |   |   |   |
| V | $R_9$ = −9.862 | $T_5$ = 5.190 |   | $ND_5$ = 1.48651 | $\nu_5$ = 84.47 |
| VI | $R_{10}$ = 14.180 | $T_6$ = 1.200 | $S_5$ = .05 | $ND_6$ = 1.80491 | $\nu_6$ = 25.43 |
|    | $R_{11}$ = 5.229 |   |   |   |   |
| VII | $R_{12}$ = 72.300 | $T_7$ = 5.346 |   | $ND_7$ = 1.48651 | $\nu_7$ = 84.47 |
| VIII | $R_{13}$ = Plano | $T_8$ = 2.134 | $S_6$ = 13.289 | $ND_8$ = 1.75496 | $\nu_8$ = 27.58 |
|      | $R_{14}$ = −5.450 |   |   |   |   |
| IX | $R_{15}$ = 8.616 | $T_9$ = 1.807 |   | $ND_9$ = 1.61328 | $\nu_9$ = 44.30 |

What is claimed is:
1. An achromatic microscope objective having a magnification of substantially 100X and a numerical aperture of substantially 1.25 for forming an image of an object plane, said image being well corrected for chromatic aberrations, coma, astigmatism, and curvature of image field, said objective comprising the following components:
   a front plano-convex lens I;
   a second concavo-convex lens II;
   a third concavo-convex lens III;
   a fourth convex-concave lens element IV;
   a fifth double convex lens element V;
   said fourth and fifth elements forming a doublet;
   a sixth convex-concave lens element VI;
   a seventh convex-concave lens element VII;
   said sixth and seventh elements forming a doublet;
   an eighth plano-convex lens element VIII;
   a ninth double concave lens element IX;
   said eighth and ninth elements forming a doublet;
   all of said components being optically aligned;
   the parameters of lens radii (R), thicknesses (T), spacings (S), refractive indices (ND), and Abbe numbers ($\gamma$), being determined by the following relationship wherein radii, thicknesses, and spacings are expressed in millimeters:

2. An achromatic microscope objective having a magnification of substantially 100X and a numerical aperture of substantially 1.25 for forming an image of an object plane, said image being well corrected for chromatic aberrations, coma, astigmatism, and curvature of image field, said objective comprising the following components:
   a front plano-convex lens I;
   a second concavo-convex lens II;
   a third concavo-convex lens III;
   a fourth convex-concave lens element IV;
   a fifth double convex lens element V;
   said fourth and fifth elements forming a doublet;
   a sixth convex-concave lens element VI;
   a seventh convex-concave lens element VII;
   said sixth and seventh elements forming a doublet;
   an eighth plano-convex lens element VIII;
   a ninth double concave lens element IX;
   said eighth and ninth elements forming a doublet;
   all of said components being optically aligned;
   the parameters of lens radii (R), thicknesses (T), spacings (S), refractive indices (ND), and Abbe numbers ($\gamma$), being determined by the following relationship wherein radii, thicknesses, and spacings are expressed in millimeters:

MAGNIFICATION = 100X  N.A. = 1.25

| Lens | Radius R | Thickness T | Space S | Refractive Index ND | Abbe Number $\nu$ |
|---|---|---|---|---|---|
| I | $R_1$ = Plano | $T_1$ = 1.5110F | $S_1$ = .1703F | $ND_1$ = 1.51700 | $\nu_1$ = 64.50 |
|   | $R_2$ = −1.1841F | | | | |
| II | $R_3$ = −2.8995F | $T_2$ = 1.0165F | $S_2$ = .0110F | $ND_2$ = 1.60550 | $\nu_2$ = 43.93 |
|   | $R_4$ = −2.0209F | | | | |
| III | $R_5$ = −7.2198F | $T_3$ = 1.0879F | $S_3$ = .0110F | $ND_3$ = 1.60550 | $\nu_3$ = 43.93 |
|   | $R_6$ = −4.4868F | | | | |
| IV | $R_7$ = 7.2198F | $T_4$ = .6593F | $S_4$ = .1648F | $ND_4$ = 1.80491 | $\nu_4$ = 25.43 |
|   | $R_8$ = 4.3852F | | | | |
| V | $R_9$ = −5.4187F | $T_5$ = 2.8516F | | $ND_5$ = 1.48651 | $\nu_5$ = 84.47 |
| VI | $R_{10}$ = 7.7912F | $T_6$ = .6593F | $S_5$ = .0275F | $ND_6$ = 1.80491 | $\nu_6$ = 25.43 |
|   | $R_{11}$ = 2.8731F | | | | |
| VII | $R_{12}$ = 39.7253F | $T_7$ = 2.9374F | | $ND_7$ = 1.48651 | $\nu_7$ = 84.47 |
| VIII | $R_{13}$ = Plano | $T_8$ = 1.1725F | $S_6$ = 7.3016F | $ND_8$ = 1.75496 | $\nu_8$ = 27.58 |
|   | $R_{14}$ = −2.9945F | | | | |
| IX | $R_{15}$ = 4.7341F | $T_9$ = .9929F | | $ND_9$ = 1.61328 | $\nu_9$ = 44.30 |

F = 1.820  MAGNIFICATION = 100X  N.A. = 1.25

| Lens | Radius R | Thickness T | Space S | Refractive Index ND | Abbe Number $\nu$ |
|---|---|---|---|---|---|
| I | $R_1$ = Plano | $T_1$ = 2.750 | $S_1$ = .31 | $ND_1$ = 1.51700 | $\nu_1$ = 64.50 |
|   | $R_2$ = −2.155 | | | | |
| II | $R_3$ = −5.277 | $T_2$ = 1.850 | $S_2$ = .02 | $ND_2$ = 1.60550 | $\nu_2$ = 43.93 |
|   | $R_4$ = −3.678 | | | | |
| III | $R_5$ = −13.140 | $T_3$ = 1.980 | $S_3$ = .02 | $ND_3$ = 1.60550 | $\nu_3$ = 43.93 |
|   | $R_6$ = −8.166 | | | | |
| IV | $R_7$ = 13.140 | $T_4$ = 1.200 | $S_4$ = .300 | $ND_4$ = 1.80491 | $\nu_4$ = 25.43 |
|   | $R_8$ = 7.981 | | | | |
| V | $R_9$ = −9.862 | $T_5$ = 5.190 | $S_5$ = .05 | $ND_5$ = 1.48651 | $\nu_5$ = 84.47 |
|   | $R_{10}$ = 14.180 | | | | |

F=1.820 MAGNIFICATION=100× N.A.=1.25

| Lens | Radius R | Thickness T | Space S | Refractive Index ND | Abbe Number ν |
|---|---|---|---|---|---|
| VI | $R_{11}$=5.229 | $T_6$=1.200 | | ND6=1.80491 | ν6=25.43 |
| VII | $R_{12}$=72.300 | $T_7$=5.346 | $S_6$=13.289 | ND7=1.48651 | ν7=84.47 |
| VIII | $R_{13}$=Plano | $T_8$=2.134 | | ND8=1.75496 | ν8=27.58 |
| IX | $R_{14}$=−5.450 | $T_9$=1.807 | | ND9=1.61328 | ν9=44.30 |
| | $R_{15}$=8.616 | | | | |

\* \* \* \* \*